US011990081B2

(12) United States Patent
Huang et al.

(10) Patent No.: US 11,990,081 B2
(45) Date of Patent: May 21, 2024

(54) GATE DRIVE CIRCUIT, GATE DRIVING METHOD AND DISPLAY DEVICE

(71) Applicants: MIANYANG HKC OPTOELECTRONICS TECHNOLOGY CO., LTD., Sichuan (CN); HKC CORPORATION LIMITED, Shenzhen (CN)

(72) Inventors: Xueyong Huang, Sichuan (CN); Haoxuan Zheng, Sichuan (CN)

(73) Assignees: MIANYANG HKC OPTOELECTRONICS TECHNOLOGY CO., LTD., Sichuan (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/145,432

(22) Filed: Dec. 22, 2022

(65) Prior Publication Data

US 2023/0419874 A1 Dec. 28, 2023

(30) Foreign Application Priority Data

Jun. 27, 2022 (CN) ......................... 202210735769.2

(51) Int. Cl.
*G09G 3/20* (2006.01)

(52) U.S. Cl.
CPC ... *G09G 3/2092* (2013.01); *G09G 2300/0842* (2013.01); *G09G 2310/0267* (2013.01)

(58) Field of Classification Search
CPC ......... G09G 3/2092; G09G 2300/0842; G09G 2310/0267; G09G 3/20; G09G 2330/028; G09G 3/3696; G09G 2330/00
See application file for complete search history.

(56) References Cited

U.S. PATENT DOCUMENTS 8,018,176 B1 * 9/2011 Small .................... H02M 3/156 315/307
8,223,140 B2 * 7/2012 Lee ...................... G09G 3/3233 345/211
10,511,223 B2 * 12/2019 McIntosh .............. H02M 3/155
2006/0071926 A1 * 4/2006 Lee ...................... G09G 3/3696 345/211
2008/0054987 A1 * 3/2008 Choi ........................ H03K 5/13 327/512
2008/0088550 A1 * 4/2008 Kim ....................... H05B 45/38 345/82

(Continued)

*Primary Examiner* — Jose R Soto Lopez
(74) *Attorney, Agent, or Firm* — Hodgson Russ LLP

(57) ABSTRACT

A gate drive circuit includes a charging circuit, a first shutdown circuit and a second shutdown circuit, and a first startup circuit and a second startup circuit. The charging circuit includes an energy storage element, a first switch unit and a second switch unit. The energy storage element switches between charging and discharging states based on control signals responded by control terminals of the first switch unit and the second switch unit. Control terminals of the first shutdown/startup circuit and second shutdown/startup circuit respond to the shutdown/startup control signal when the energy storage element is in the discharging state so that output terminals of the first shutdown/startup circuit and the second shutdown/startup circuit output two shutdown/startup signals to the sub-pixel.

18 Claims, 9 Drawing Sheets

(56) References Cited

U.S. PATENT DOCUMENTS

| | | | | |
|---|---|---|---|---|
| 2008/0106666 | A1* | 5/2008 | Lee | G09G 3/3677 349/48 |
| 2008/0122829 | A1* | 5/2008 | Park | G09G 3/3677 345/213 |
| 2008/0150856 | A1* | 6/2008 | Nam | G09G 3/3696 345/87 |
| 2008/0180431 | A1* | 7/2008 | Myung | G09G 3/3696 345/212 |
| 2008/0309597 | A1* | 12/2008 | Nam | G09G 3/3696 345/87 |
| 2009/0073154 | A1* | 3/2009 | Lee | G09G 3/3696 345/94 |
| 2009/0102779 | A1* | 4/2009 | Jo | G09G 3/3696 345/204 |
| 2009/0303403 | A1* | 12/2009 | Park | G09G 3/3696 323/299 |
| 2010/0033475 | A1* | 2/2010 | Choi | G09G 3/3696 345/89 |
| 2010/0039364 | A1* | 2/2010 | Lee | G09G 3/3696 345/100 |
| 2010/0053054 | A1* | 3/2010 | Jeong | G09G 3/3674 345/94 |
| 2010/0177081 | A1* | 7/2010 | Lee | G09G 3/3648 345/211 |
| 2011/0175892 | A1* | 7/2011 | Lee | G09G 3/3696 345/212 |
| 2012/0223647 | A1* | 9/2012 | Brokaw | G09G 3/3648 315/160 |
| 2012/0242639 | A1* | 9/2012 | Lee | G09G 3/3677 345/211 |
| 2013/0215160 | A1* | 8/2013 | Pyun | G09G 3/3655 345/94 |
| 2015/0115826 | A1* | 4/2015 | Koo | G09G 3/3266 315/210 |
| 2016/0104406 | A1* | 4/2016 | Hwang | G09G 3/3696 345/55 |
| 2017/0243534 | A1* | 8/2017 | Zhang | G09G 3/3225 |
| 2019/0318705 | A1* | 10/2019 | Lee | G09G 3/3696 |
| 2019/0356226 | A1* | 11/2019 | Lin | H02M 3/157 |
| 2019/0379381 | A1* | 12/2019 | Lu | G11C 16/045 |
| 2021/0090506 | A1* | 3/2021 | Kim | G09G 3/20 |
| 2021/0118391 | A1* | 4/2021 | Ahn | G09G 3/3696 |
| 2021/0263384 | A1* | 8/2021 | Nakamura | G09G 3/3674 |
| 2021/0358389 | A1* | 11/2021 | Yue | G09G 3/32 |
| 2023/0083400 | A1* | 3/2023 | Huang | G06F 1/3265 345/173 |
| 2023/0196955 | A1* | 6/2023 | Jang | G09G 3/3674 345/204 |

* cited by examiner

FIG. 13
In First Time Period: Sending Second Switch Startup Signal to Control Terminal of Second Switch Unit to Turn On Second Switch Unit
S201
In Second Time Period: Maintaining Turning On Second Switch Unit, Sending First Switch Startup Signal to Control Terminal of First Switch Unit to Turn On First Switch Unit So That Energy Storage Element Is in Charging State
S202
In Third Time Period: Continuing to Maintain Turning On Second Switch Unit, Sending First Switch Shutdown Signal to Control Terminal of First Switch Unit to Turn Off First Switch Unit So That Energy Storage Element Is in Discharging State, and Simultaneously Sending First Shutdown Control Signal to Control Terminal of First Shutdown Circuit to Turn On First Shutdown Circuit and Output First Shutdown Signal to Sub-Pixel; When First Shutdown Circuit Is Turned On, Second Shutdown Circuit, First Startup Circuit and Second Startup Circuit Being Turned Off
S203
In Fourth Time Period: Continuing to Maintain Turning On Second Switch Unit, and Sending First Switch Startup Signal to Control Terminal of First Switch Unit to Turn On First Switch Unit So That Energy Storage Element Is in Charging State
S204
In Fifth Time Period: Continuing to Maintain Turning On Second Switch Unit, Sending First Switch Shutdown Signal to Control Terminal of First Switch Unit to Turn Off First Switch Unit So That Energy Storage Element Is in Discharging State, and Simultaneously Sending Second Shutdown Control Signal to Control Terminal of First Shutdown Circuit to Turn On Second Shutdown Circuit and Output Second Shutdown Signal to Sub-Pixel; Sub-Pixel Being Turned Off After Receiving First Shutdown Signal and Second Shutdown Signal In Turn; Sub-Pixel Being Turned Off After Receiving First Shutdown Signal and Second Shutdown Signal In Turn
S205
In Sixth Time Period: Sending First Switch Startup Signal to Control Terminal of First Switch Unit to Turn On First Switch Unit
S206
In Seventh Time Period: Maintaining Turning On First Switch Unit, and Sending Second Switch Startup Signal to Control Terminal of Second Switch Unit to Turn On Second Switch Unit So That Energy Storage Element Is in Charging State
S207
In Eighth Time Period: Continuing to Maintain Turning On First Switch Unit, Sending Second Switch Shutdown Signal to Control Terminal of Second Switch Unit to Turn Off Second Switch Unit So That Energy Storage Element Is in Discharging State, and Simultaneously Sending Second Startup Control Signal to Control Terminal of Second Startup Circuit to Turn On Second Startup Circuit and Output Second Startup Signal to Sub-Pixel; When Second Startup Circuit Is Turned On, First Shutdown Circuit, Second Shutdown Circuit and First Startup Circuit Being Turned Off
S208
In Ninth Time Period: Continuing to Maintain Turning On First Switch Unit, and Sending Second Switch Startup Signal to Control Terminal of Second Switch Unit to Turn On Second Switch Unit So That Energy Storage Element Is in Charging State
S209
In Tenth Time Period: Continuing to Maintain Turning On First Switch Unit, Sending Second Switch Shutdown Signal to Control Terminal of Second Switch Unit to Turn Off Second Switch Unit So That Energy Storage Element Is in Discharging State, and Simultaneously Sending First Startup Control Signal to Control Terminal of First Startup Circuit to Turn On First Startup Circuit and Output First Startup Signal to Sub-Pixel; Sub-Pixel Being Turned On After Receiving Second Startup Signal and First Startup Signal in Turn; When First Startup Circuit Being Turned Off, Second Startup Circuit, First Shutdown Circuit and Second Shutdown Circuit Being Turned Off
S210

GATE DRIVE CIRCUIT, GATE DRIVING METHOD AND DISPLAY DEVICE

CROSS-REFERENCE TO RELATED APPLICATIONS

This application claims priority to Chinese Patent Application No. 202210735769.2, filed Jun. 27, 2022, the entire disclosure of which is incorporated herein by reference.

FIELD OF TECHNOLOGY

The present application relates to the display technology field, in particular to a gate drive circuit, a gate driving method and a display device.

BACKGROUND

With the continuous improvement of the refresh rate and resolution of the display screen, the charging time of the panel is gradually shortened. Among the schemes to improve the charging rate and prevent wrong impact, the commonly used schemes are to add two-way VGH (high-level) and two-way VGL (low-level). This method requires a single two-way VGH and a single two-way VGL, resulting in a total of four separate circuits, and each separate circuit needs to be equipped with a separate energy storage element, which has high cost.

SUMMARY

There are provided a gate drive circuit, a gate driving method and a display panel according to embodiments of the present application. The technical solution is as below:

According to a first aspect of the present application, there is provided a gate drive circuit including:

a charging circuit comprising a first switch unit, a second switch unit and an energy storage element, wherein a first terminal of the first switch unit and a first terminal of the energy storage element are connected to a first node, a first terminal of the second switch unit and a second terminal of the energy storage element are connected to a second node, wherein a second terminal of the first switch unit is connected to a voltage supply terminal, a second terminal of the second switch unit is grounded, and the energy storage element switches between a charging state and a discharging state based on a control signal responded by a control terminal of the first switch unit and a control terminal of the second switch unit;

a first shutdown circuit and a second shutdown circuit, wherein input terminals of the first shutdown circuit and the second shutdown circuit being are connected to the first node, and the output terminals of the first shutdown circuit and the second shutdown circuit being are connected to a sub-pixel; wherein the control terminal of the first shutdown circuit responds to a first shutdown control signal when the energy storage element is in a discharging state, so that the output terminal of the first shutdown circuit outputs a first shutdown signal to the sub-pixel; and wherein the control terminal of the second shutdown circuit responds to a second shutdown control signal when the energy storage element is in the discharging state, so that the output terminal of the second shutdown circuit outputs a second shutdown signal to the sub-pixel, wherein the first shutdown control signal and the second shutdown control signal are sequentially output, and the first shutdown signal and the second shutdown signal have different magnitudes; and a first startup circuit and a second startup circuit, wherein input terminals of the first startup circuit and the second startup circuit are connected to the second node, and output terminals of the first startup circuit and the second startup circuit are connected to the sub-pixel; wherein a control terminal of the first startup circuit responds to a first startup control signal when the energy storage element is in the discharging state, so that the output terminal of the first startup circuit outputs a first startup signal to the sub-pixel; and wherein a control terminal of the second startup circuit responds to a second startup control signal when the energy storage element is in the discharging state, so that the output terminal of the second startup circuit outputs a second startup signal to the sub-pixel, wherein the first startup control signal and the second startup control signal are sequentially output, and the first startup signal and the second startup signal have different magnitudes.

According to a second aspect of the present application, there is provided a gate driving method applied to any one of the gate drive circuits as described above. The method includes:

in a first time period: sending a second switch startup signal to a control terminal of a second switch unit to turn on the second switch unit;

in a second time period: maintaining turning on the second switch unit, and sending a first switch startup signal to a control terminal of the first switch unit to turn on the first switch unit so that an energy storage element is in a charging state;

in a third time period: continuing to maintain turning on the second switch unit, sending a first switch shutdown signal to the control terminal of the first switch unit to turn off the first switch unit so that the energy storage element is in a discharging state, and simultaneously sending a first shutdown control signal to a control terminal of the first shutdown circuit to turn on the first shutdown circuit and output a first shutdown signal to a sub-pixel; wherein the second shutdown circuit, the first startup circuit and the second startup circuit being turned off, when the first shutdown circuit is turned on;

in a fourth time period: continuing to maintain turning on the second switch unit, and sending the first switch startup signal to the control terminal of the first switch unit to turn on the first switch unit so that the energy storage element is in the charging state;

in a fifth time period: continuing to maintain turning on the second switch unit, sending a first switch shutdown signal to the control terminal of the first switch unit to turn off the first switch unit so that the energy storage element is in a discharging state, and simultaneously sending a second shutdown control signal to the control terminal of the first shutdown circuit to turn on the second shutdown circuit and output a second shutdown signal to the sub-pixel; wherein the sub-pixel is turned off after receiving the first shutdown signal and the second shutdown signal in turn; wherein the first shutdown circuit, the first startup circuit and the second startup circuit are turned off, when the second shutdown circuit is turned on;

in a sixth time period: sending a first switch startup signal to the control terminal of the first switch unit to turn on the first switch unit;

in a seventh time period: maintaining turning on the first switch unit, and sending the second switch startup signal to the control terminal of the second switch unit to turn on the second switch unit so that the energy storage element is in the charging state;

in an eighth time period: continuing to maintain turning on the first switch unit, sending a second switch shutdown signal to the control terminal of the second switch unit to turn off the second switch unit so that the energy storage element is in the discharging state, and simultaneously sending a second startup control signal to the control terminal of the second startup circuit to turn on the second startup circuit and output a second startup signal to the sub-pixel; wherein the first shutdown circuit, the second shutdown circuit and the first startup circuit being turned off, when the second startup circuit is turned on;

in a ninth time period: continuing to maintain turning on the first switch unit, and sending the second switch startup signal to the control terminal of the second switch unit to turn on the second switch unit so that the energy storage element is in the charging state; and in a tenth time period: continuing to maintain turning on the first switch unit, sending the second switch shutdown signal to the control terminal of the second switch unit to turn off the second switch unit so that the energy storage element is in the discharging state, and simultaneously sending the first startup control signal to the control terminal of the first startup circuit to turn on the first startup circuit and output a first startup signal to the sub-pixel; wherein the sub-pixel is turned on after receiving the second startup signal and the first startup signal in turn; wherein the second startup circuit, the first shutdown circuit and the second shutdown circuit being turned off, when the first startup circuit being turned off.

According to a third aspect of the present application, there is provided a display device including: a display panel having a display area provided with sub-pixels arranged in an array; and the gate drive circuit according to any one described above including a first shutdown circuit, a second shutdown circuit, a first startup circuit and a second startup circuit and disposed in a non-display area of the display panel, wherein output terminals of the first shutdown circuit, the second shutdown circuit, the first startup circuit and the second startup circuit are connected to the sub-pixels.

It should be understood that the above general description and the following detailed description are exemplary only and are not intended to limit the present application.

BRIEF DESCRIPTION OF DRAWINGS

The above and other objects features and advantages of the present application will become more apparent by describing exemplary embodiments thereof in detail with reference to the accompanying drawings.

DESCRIPTION OF THE EMBODIMENTS

Figure 1:
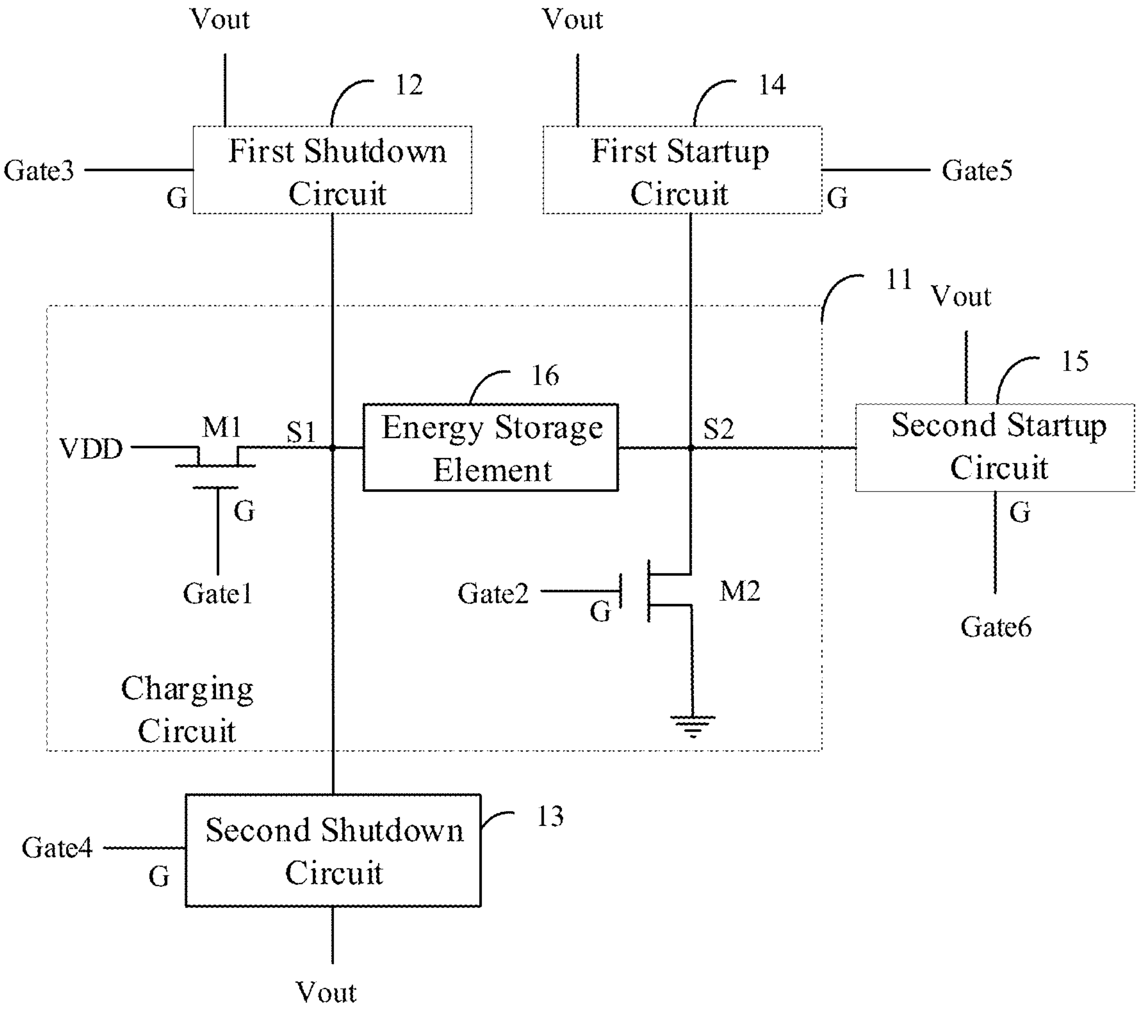
FIG. 1 is a schematic diagram of a gate drive circuit according to an embodiment of the present application.

Although the present application can readily be embodied in different forms of embodiment, however, only some of the specific embodiments are shown in the drawings and will be described in detail in the description, while it is understood that the description is to be regarded as an exemplary illustration of the principles of the present application and is not intended to limit the present application to those described herein.

Thus, one feature pointed out in the description is intended to illustrate one of the features of one embodiment of the present application and is not intended to imply that each embodiment of the present application must have the illustrated feature. In addition, it should be noted that many features are described in the description. Although certain features may be combined to illustrate a possible system design, these features may also be used for other unspecified combinations. Therefore, unless otherwise stated, the illustrated combinations are not intended to be limiting.

In the embodiments illustrated in the drawings, indications of direction (such as up, down, left, right, front and back) are used to explain that the structure and movement of the various elements of the present application are not absolute but relative. These descriptions are appropriate when these elements are in the positions shown in the drawings. If the description of the positions of the element changes, the indications of the directions change accordingly.

The exemplary embodiments will now be described more fully with reference to the accompanying drawings. However, the example embodiments can be implemented in a variety of forms and should not be construed as being limited to the examples set forth herein. Rather, these embodiments are provided so that the present application will be more comprehensive and complete, and the concept of example embodiments will be fully communicated to those skilled in the art. The accompanying drawings are only schematic illustrations of the present application and are not necessarily drawn to scale. Like reference numerals in the figures denote identical or similar parts and thus repetitive descriptions thereof will be omitted.

The preferred embodiment of the present application is further elaborated below in conjunction with the accompanying drawings of the description.

Embodiment 1

Embodiment 1 of the present application provides a gate drive circuit, which, as shown in FIG. 1, includes a charging circuit 11, a first shutdown circuit 12, a second shutdown circuit 13, a first startup circuit 14 and a second startup circuit 15. The charging circuit includes a first switch unit M1, a second switch unit M2 and an energy storage element 16. A first terminal of the first switch unit M1 and a first terminal of the energy storage element 16 are both connected to a first node S1, and a first terminal of the second switch unit M2 and a second terminal of the energy storage element 16 are both connected to a second node S2.

The second terminal of the first switch unit M1 is connected to a voltage supply terminal VDD, a second terminal of the second switch unit M2 is grounded, and the energy storage element 16 switches between a charging state and a discharging state based on a control signal responded to by a control terminal G of the first switch unit M1 and the control terminal G of the second switch unit M2.

The input terminals of the first shutdown circuit 12 and the second shutdown circuit 13 are connected to the first node S1, and the output terminals Vout of the first shutdown circuit 12 and the second shutdown circuit 13 are connected to the sub-pixels. The control terminal G of the first shutdown circuit 12 responds to the first shutdown control signal when the energy storage element 16 is in the discharging state so that the output terminal Vout of the first shutdown circuit 12 outputs a first shutdown signal to the sub-pixel. The control terminal G of the second shutdown circuit 13 responds to the second shutdown control signal when the energy storage element 16 is in the discharging state so that the output terminal Vout of the second shutdown circuit 13 outputs the second shutdown signal to the sub-pixels. The first shutdown control signal and the second shutdown control signal are sequentially output, and the first shutdown signal and the second shutdown signal have different magnitudes.

The input terminals of the first startup circuit 14 and the second startup circuit 15 are connected to the second node S2, and the output terminals Vout of the first startup circuit 14 and the second startup circuit 15 are connected to the sub-pixels. The control terminal G of the first startup circuit 14 responds to the first startup control signal when the energy storage element 16 is in the discharging state so that its output terminal Vout outputs the first startup signal to the sub-pixel. The control terminal G of the second startup circuit 15 responds to the second startup control signal when the energy storage element 16 is in the discharging state, so that the output terminal Vout of the second startup circuit 15 outputs the second startup signal to the sub-pixel. The first startup control signal and the second startup control signal to be sequentially output, and the first startup signal and the second startup signal have different magnitudes.

The magnitudes of the first shutdown signal the second shutdown signal are different so that when the thin film transistor is turned off, the gate voltage can be first reduced to a smaller VGL voltage and then maintained at a larger VGL voltage, thereby effectively saving the fall time. The magnitudes of the first startup signal and the second startup signal are different so that when the thin film transistor is turned on, the gate startup voltage of the thin film transistor is firstly generated with an over drive, that is, a larger VGH voltage is firstly generated to reduce the rise time, and then reduced to a smaller VGH voltage during normal operation, thereby achieving the technical effect of improving the charging rate and preventing wrong impact. Moreover, using a common energy storage element can reduce the cost of the circuit on this basis.

Illustratively, the first shutdown signal and the second shutdown signal are both low-level signals, the first shutdown signal is outputted before the second shutdown signal, and the value of the first shutdown signal is smaller than the value of the second shutdown signal. The first startup signal and the second startup signal are both high-level signals, the second startup signal is outputted before the first startup signal, and the value of the second startup signal is larger than the value of the first startup signal, thereby achieving the technical effect of improving the charging rate and preventing wrong impact.

In addition, compared with the way of generating VGH and VGL through the charge pump circuit, the scheme adopted in the embodiment of the present application can avoid the problems of poor voltage stabilizing ability and weak load carrying capability of the capacitor when the output current of the charge pump is large, and the drive ability of the embodiment of the present application is stronger.

Figure 2:
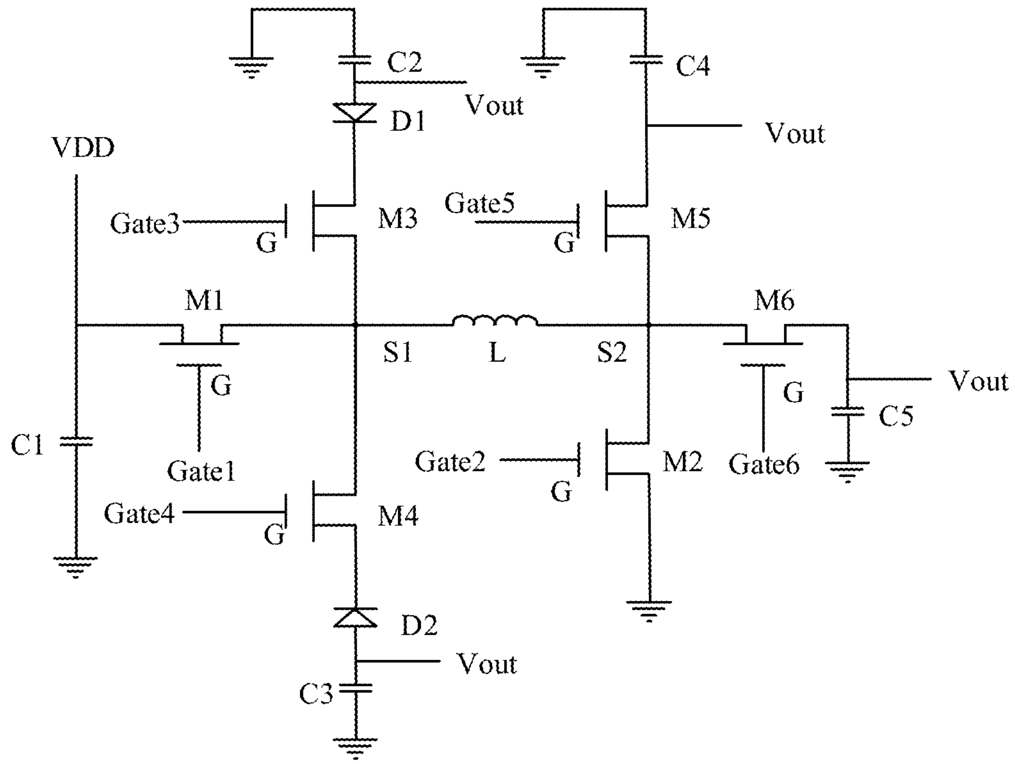
FIG. 2 is another schematic diagram of a gate drive circuit according to an embodiment of the present application.

By way of example, as shown in FIG. 2 the charging circuit further includes a charging capacitor C1. The first shutdown circuit 12 includes a third switch unit M3, a first diode D1, and a first capacitor C2. The second shutdown circuit 13 includes a fourth switch unit M4, a second diode D2 and a second capacitor C3. The first startup circuit 14 includes a fifth switch unit M5 and a third capacitor C4. The second startup circuit 15 includes a sixth switch unit M6 and a fourth capacitor C5.

A first terminal of the charging capacitor C1 is connected to a voltage supply terminal VDD, and a second terminal of the charging capacitor C1 is grounded. When the energy storage element 16 is in the charging state and the discharging state, the control terminal G of the second switch unit M2 is enabled in response to the second switch startup signal. When the energy storage element 16 is in the charging state, the control terminal G of the first switch unit M1 is turned on in response to the first switch startup signal. When the energy storage element 16 is in the discharging state, the control terminal G of the first switch unit M1 is turned off in response to the first switching shutdown signal.

The input terminal of the third switch unit M3 is connected to the first node S1, the output terminal of the third switch unit M3 is connected to the first terminal of the first diode D1, the second terminal of the first diode D1 and the first terminal of the first capacitor C2 are both connected to the output terminal of the first shutdown circuit 12, and the second terminal of the first capacitor C2 is grounded. When the energy storage element 16 is in the charging state and the discharging state, the control terminal G of the third switch unit M3 is turned on in response to the third switch startup signal. The input terminal of the third switch unit M3 serves as the input terminal of the first shutdown circuit 12.

The input terminal of the fourth switch unit M4 is connected to the first node S1, the output terminal of the fourth switch unit M4 is connected to the first terminal of the second diode D2, the second terminal of the second diode D2 and the first terminal of the second capacitor C3 are both connected to the output terminal of the second shutdown circuit 13, and the second terminal of the second capacitor C3 is grounded. When the energy storage element 16 is in the charging state and the discharging state, the control terminal G of the fourth switch unit M4 is turned on in response to the fourth switch startup signal. The input terminal of the fourth switch unit M4 serves as the input terminal of the second shutdown circuit 13.

The input terminal of the fifth switch unit M5 is connected to the second node S2, the output terminal of the fifth switch unit M5 and the first terminal of the third capacitor C4 are both connected to the output terminal of the first startup circuit 14, and the second terminal of the third capacitor C4 is grounded. The control terminal G of the fifth switch unit M5 is turned off in response to the second switch shutdown signal when the energy storage element 16 is in the charging state, and the control terminal G of the fifth switch unit M5 is turned on in response to the fifth switch startup signal when the energy storage element 16 is in the discharging state. The input terminal of the fifth switch unit M5 serves as the input terminal of the first startup circuit 14.

The input terminal of the sixth switch unit M6 is connected to the second node S2, the output terminal of the sixth switch unit M6 and the first terminal of the fourth capacitor C5 are both connected to the output terminal of the second startup circuit 15, and the second terminal of the fourth capacitor C5 is grounded. The control terminal G of the sixth switch unit M6 is turned off in response to the third switch-shutdown signal when the energy storage element 16 is in the charging state, and the control terminal G of the sixth switch unit M6 is turned on in response to the sixth switch-startup signal when the energy storage element 16 is in a discharging state. The input terminal of the sixth switch unit M6 serves as the input terminal of the second startup circuit 15.

Further, with reference to FIGS. 3 to 6, the states of each switch unit will be described when the gate drive circuit is used to generate the first shutdown signal, the second shutdown signal, the first startup signal and the second startup signal, respectively. When the gate drive circuit is used to generate the above signal, the energy storage element 16 is in the discharging state.

Figure 3:
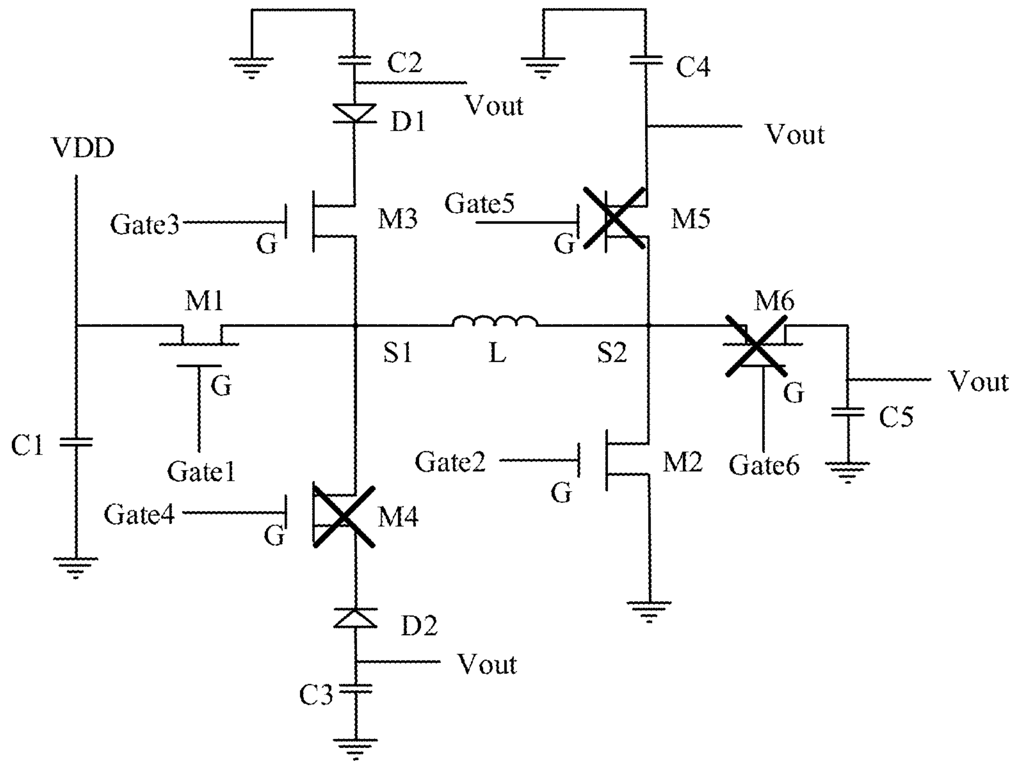
FIG. 3 is a schematic diagram of switch units in a turn-on or turn-off state when the gate drive circuit is used for generating a first shutdown signal according to embodiment 1 of the present application.

FIG. 3 is a schematic diagram of switch units in a turn-on or turn-off state when the gate drive circuit is used for generating a first shutdown signal. The third switch unit M3 is turned on and the fourth switch unit M4, the fifth switch unit M5 and the sixth switch unit M6 are all turned off.

Figure 4:
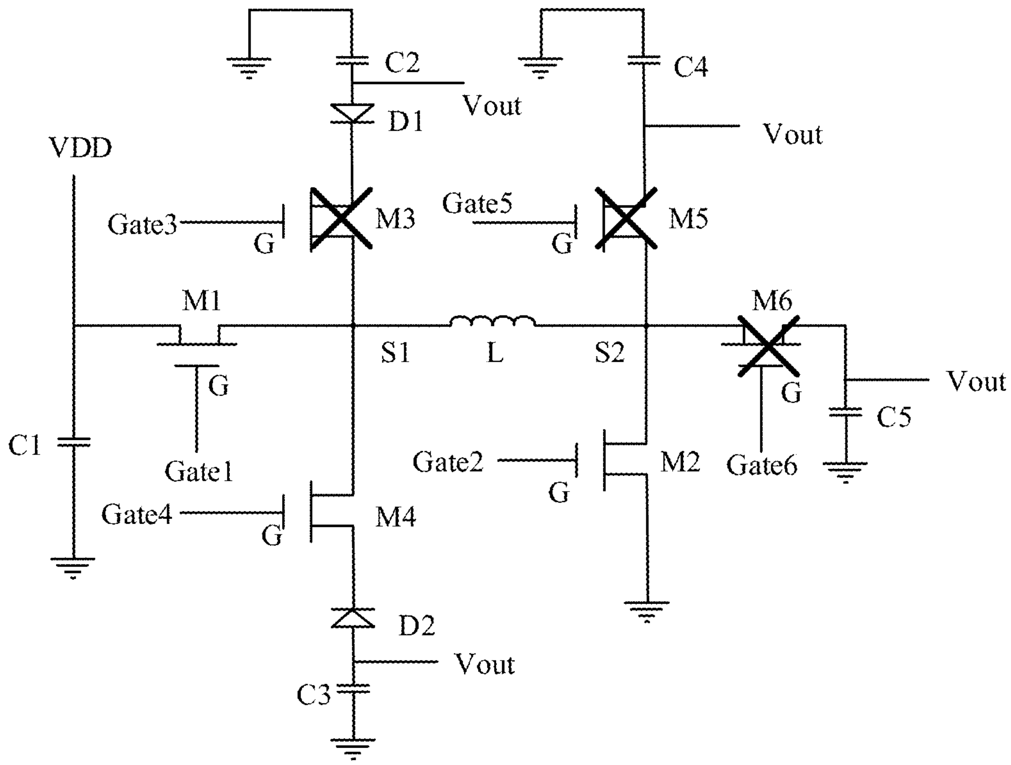
FIG. 4 is a schematic diagram of switch units in a turn-on or turn-off state when the gate drive circuit is used for generating a second shutdown signal according to embodiment 1 of the present application.

FIG. 4 is a schematic diagram of switch units in a turn-on or turn-off state when the gate drive circuit is used for generating a second shutdown signal. The fourth switch unit M4 is turned on, and the third switch unit M3, the fifth switch unit M5 and the sixth switch unit M6 are all turned off.

Figure 5:
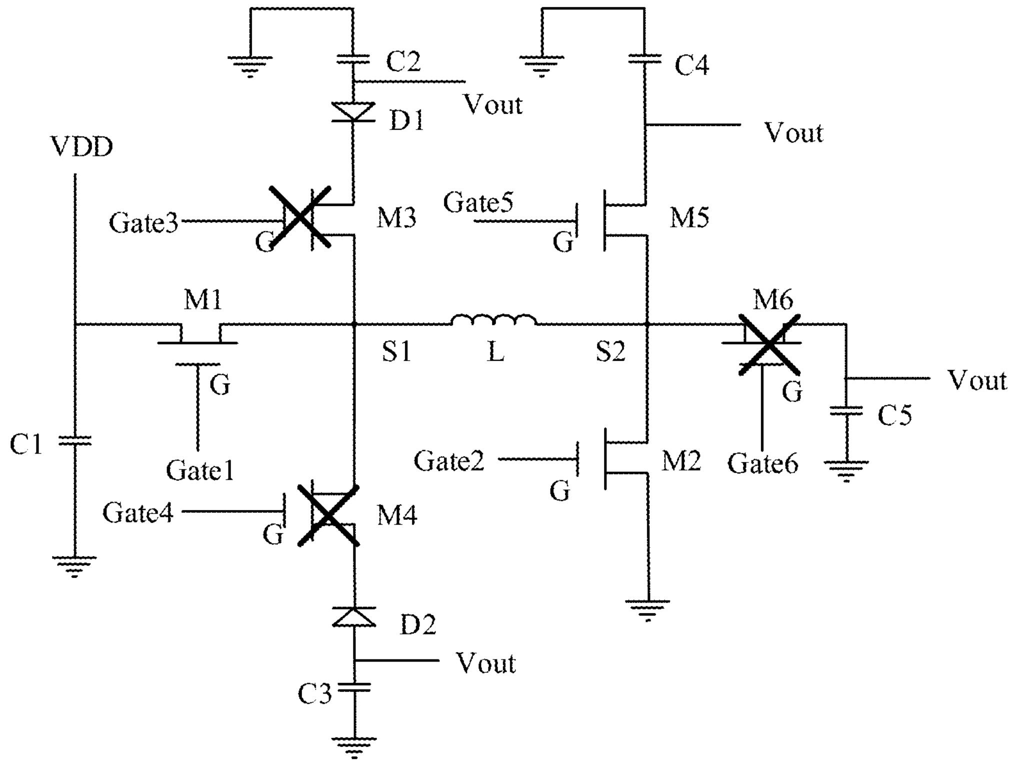
FIG. 5 is a schematic diagram of switch units in a turn-on or turn-off state when the gate drive circuit is used for generating a first startup signal according to embodiment 1 of the present application.
Figure 6:
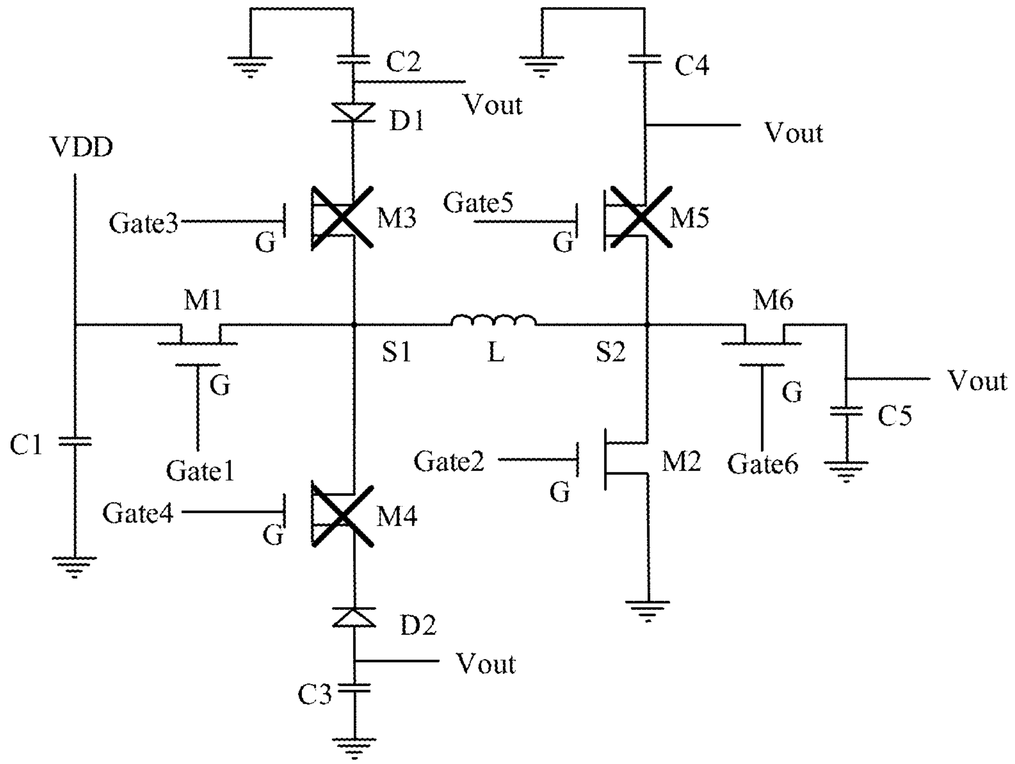
FIG. 6 is a schematic diagram of switch units in a turn-on or turn-off state when the gate drive circuit is used for generating a second startup signal according to embodiment 1 of the present application.

FIG. 5 is a schematic diagram of switch units in a turn-on or turn-off state when the gate drive circuit is used for generating a first startup signal. The fifth switch unit M5 is turned on, and the third switch unit M3, the fourth switch unit M4 and the sixth switch unit M6 are all turned off, FIG. 6 is a schematic diagram of switch units in a turn-on or turn-off state when the gate drive circuit is used to generate a second startup signal. The sixth switch unit M6 is turned on, and the third switch unit M3, the fourth switch unit M4 and the fifth switch unit M5 are all turned off.

The switch units are controlled to be turned on or turned off by a plurality of signals, so that the energy storage element can switch between the charging state and the discharging state, so that two-way VGH and two-way VGL are respectively formed in each stage, and the cost of the circuit is reduced.

The first switch startup signal and the second switch startup signal are both high-level signals, and the first switch shutdown signal is a low-level signal.

Further, both the first switch startup signal and the first switch shutdown signal are transmitted to the control terminal G of the first switch unit via the first signal line Gate1. The second switch startup signal and the second switch shutdown signal are transmitted to the control terminal G of the second switch unit via the second signal line Gate2. The third switch startup signal is transmitted to the control terminal G of the third switch unit via the third signal line Gate3. The fourth switch startup signal is transmitted to the control terminal G of the fourth switch unit via the fourth signal line Gate4. The fifth switch startup signal is transmitted to the control terminal G of the fifth switch unit via the fifth signal line Gate5. The sixth switch startup signal is transmitted to the control terminal G of the sixth switch unit via the sixth signal line Gate6.

By way of example, the energy storage element 16 is an inductor L. Only one inductor is needed to achieve two-way VGH and two-way VGL, and the cost is low.

Hereinafter, referring to FIGS. 7 to 9, the principle of generating the first shutdown signal VGL1 based on the above circuit is explained by way of example.

Figure 7:
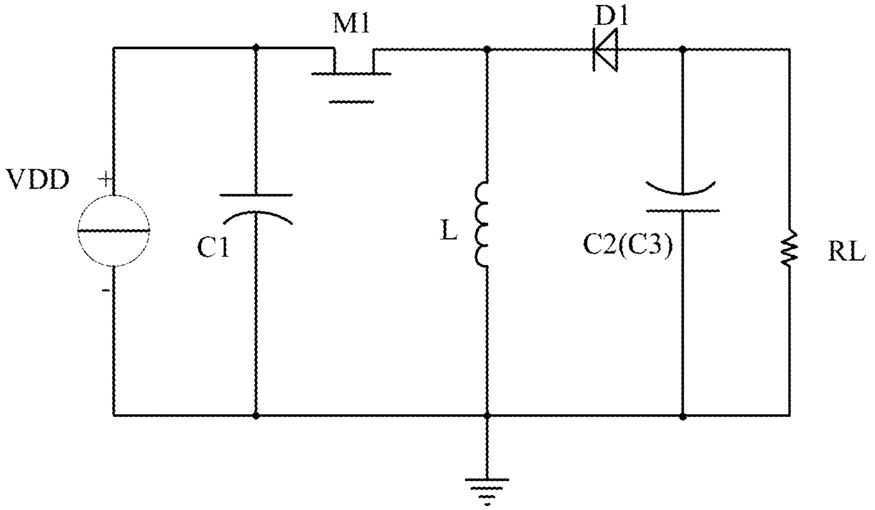
FIG. 7 is a schematic diagram of an equivalent circuit for generating a first shutdown signal according to embodiment 1 of the present application.

FIG. 7 is a schematic diagram of an equivalent circuit for generating a first shutdown signal. The circuit shown in FIG. 7 includes a voltage supply terminal VDD, an input capacitor C1, a first switch unit M1, an inductor L, a first diode D1, an output capacitor C2 and a load RL, with the connection relationship is shown in the figure.

Figure 8:
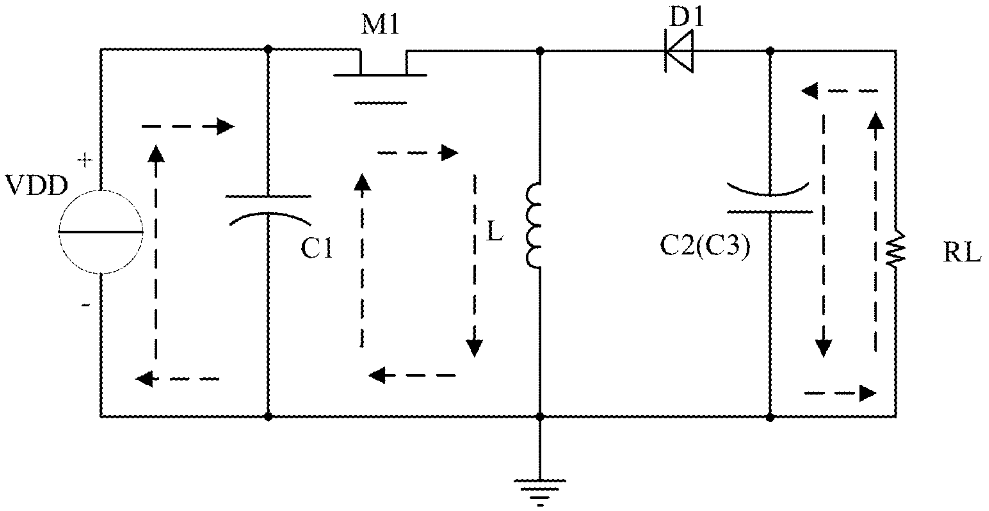
FIG. 8 shows a current flow direction of the equivalent circuit for generating the first shutdown signal when the first switch unit is turned on according to embodiment 1 of the present application.

When the first switch unit M1 is turned on, the flow direction of the current is shown in FIG. 8. At the input terminal, the inductor L1 is directly connected to both ends of the power supply. At this time, the current of the inductor L gradually rises, and the di/dt is very large during the transient state of conduction. This process is mainly powered by the input capacitor C1. At the output terminal, the capacitor C2 provides energy for the load RL by its own discharge.

Figure 9:
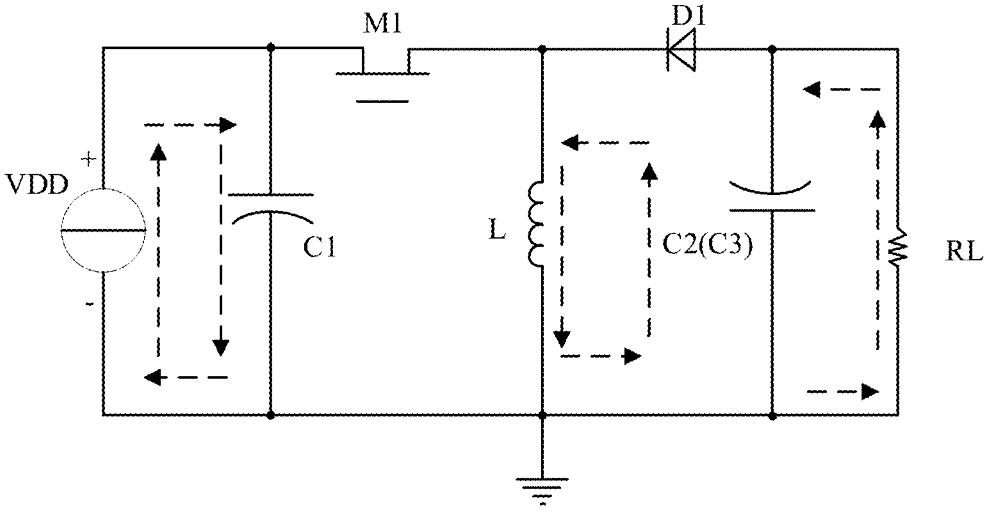
FIG. 9 shows a current flow direction of the equivalent circuit for generating the first shutdown signal when the first switch unit is turned off according to embodiment 1 of the present application.

When the first switch unit M1 is turned off, the flow direction of the current is shown in FIG. 9. At the input terminal, the power supply terminal VDD charges the input capacitor C1. At the output terminal, since the current of the inductor L cannot be abruptly changed, the inductor L supplies power to the output capacitor C2 and the load RL through the first diode D1.

After the system works stably, the inductor L volts-seconds is conserved. When the first switch unit M1 is turned on, the voltage of the inductor L is equal to the input terminal voltage VDD. When the first switch unit M1 is turned off, the voltage of the inductor L is equal to the output terminal voltage VOUT. If T denotes period, TON denotes turn-on time, TOFF denotes turn-off time, and D denotes duty cycle, then it can be obtained based on the volt-second balance:

$$VDD*TON=VOUT*TOFF;$$

$$VDD*D*T=VOUT*(1-D)*T;$$

$$VOUT=[(D/(1-D)]*VDD;$$

$$D=VOUT/(VOUT+VDD);$$

A second shutdown signal can be obtained by using a similar principle. By adjusting the duty cycle D, a first shutdown signal VGL1 and a second shutdown signal VGL2 of different magnitudes can be obtained.

The duty cycle can be adjusted by changing a ratio of the turn-on time of the first switch unit M1. For example, in three time periods, the first switch unit M1 is turned on for only one time period, the first switch unit M1 is turned off for the other two time periods. Assuming that the duration of three time periods is equal, the duty cycle is ⅓, while in two time periods, the first switch unit M1 is turned on in one time period and the first switch unit M1 is turned off in the other time period. Assuming that the duration of the two time periods is equal, the duty cycle is ½, and the voltage can be further adjusted by adjusting the duty cycle. Hereinafter, the principle of generating the first startup signal VGH1 will be explained with reference to FIGS. 10 to 12.

Figure 10:
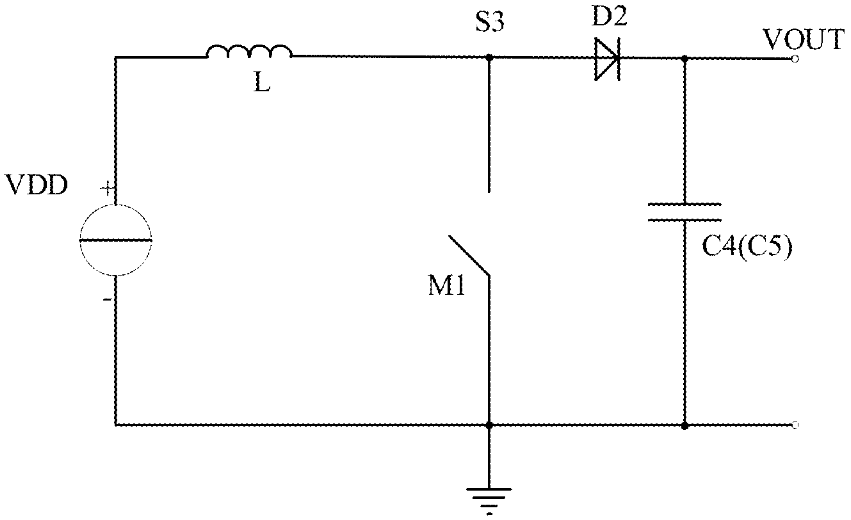
FIG. 10 is a schematic diagram of the equivalent circuit for generating a second shutdown signal according to embodiment 1 of the present application.

FIG. 10 is a schematic diagram of an equivalent circuit for generating a second startup signal. The circuit includes a voltage supply terminal VDD, an inductor L, a first switch unit M1, a second diode D2, a third capacitor C4, and an output terminal VOUT, with the connection relationship is shown in the figure. In addition, it is also possible to replace the third capacitor C4 with a fourth capacitor C5 for indicating an equivalent circuit diagram when VGH2 is generated.

Figure 11:
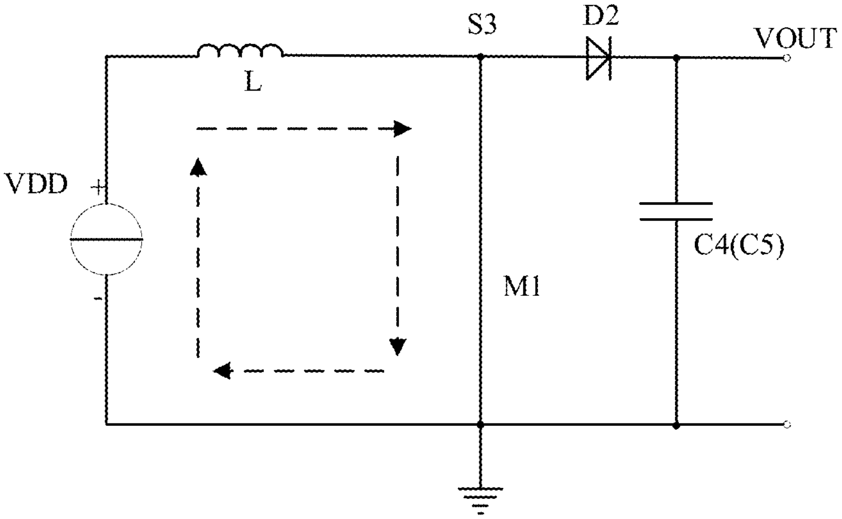
FIG. 11 shows a current flow direction of the equivalent circuit for generating the second startup signal when the first switch unit is turned on according to embodiment 1 of the present application.

When the first switch unit M1 is turned on, the current flow direction is shown in FIG. 11, the voltage of the third node S3 is 0, the power supply terminal VDD directly charges the inductor L, and the switching turn-on time dt=duty cycle*switching period=D*T.

Figure 12:
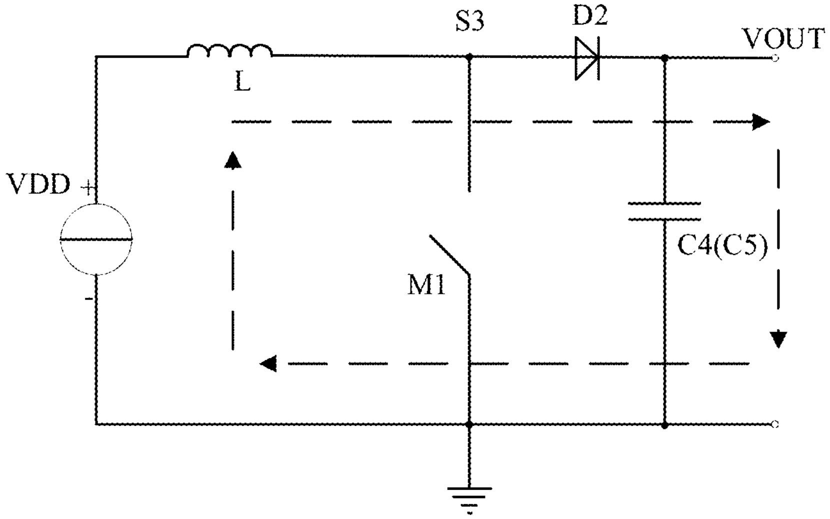
FIG. 12 shows a current flow direction of the equivalent circuit for generating the second startup signal when the first switch unit is turned off according to embodiment 1 of the present application.

When the first switch unit M1 is turned off, the current flow direction is as shown in FIG. 12, and the energy stored in the inductor L will discharge the load RL through the second diode D2 while the power supply terminal will also discharge the load RL through the second diode, and the two are superimposed to achieve voltage boosting. Discharge time dt=(1−duty cycle)*switching period=(1−D)*T.

The inductor L charges and discharges the same time when the switch is on and off, based on the volt-second conservation, as follows: VOUT=VDD/(1−D).

The second startup signal can be obtained by adopting a similar principle, and the first startup signal VGH1 and the second startup signal VGH2 with different magnitudes can be obtained by adjusting the duty cycle.

By way of example, the control terminals G of the first switch unit M1, the second switch unit M2, the first shutdown circuit 12, the second shutdown circuit 13, the first startup circuit 14, and the second startup circuit 15 are all connected to the same control chip. By integrating the above components or circuits and connecting them with the same control chip, the integration level is higher than the mode in which two separate VGL circuits and two separate VGH circuits are respectively arranged and controlled by four control chips respectively.

In this embodiment, the gate drive circuit includes two shutdown circuits and two startup circuits integrated together, and is connected with the charging circuit, and the energy storage element of the charging circuit is switched between the charging state and the discharging state based on the control signal, so that two shutdown circuits and two startup circuits can be charged by using a common energy storage element, then the two shutdown circuits respectively output a first shutdown signal and a second shutdown signal with different magnitudes, and the two startup circuits respectively output first startup signals and second startup signals with different magnitudes. Compared with the way of adopting four separate circuits respectively, the present application can share the energy storage element without providing the energy storage elements respectively for the four separate circuits, thereby eliminating the energy storage elements, which reduces the cost of the gate drive circuit, and has higher integration level, a simple structure and small occupied space.

Embodiment 2

Figure 13:
FIG. 13 is a flow diagram of a gate driving method according to embodiment 2 of the present application.

Referring to FIG. 13, embodiment 2 of the present application provides a gate driving method applied to the gate drive circuit of embodiment 1. The method includes:

S201: in a first time period: sending a second switch startup signal to a control terminal of a second switch unit to turn on the second switch unit.

Step S202: in a second time period: maintaining turning on the second switch unit, and sending a first switch startup signal to a control terminal of the first switch unit to turn on the first switch unit so that an energy storage element is in a charging state.

Step S203: in a third time period: continuing to maintain turning on the second switch unit, sending a first switch shutdown signal to the control terminal of the first switch unit to turn off the first switch unit so that the energy storage element is in a discharging state, and simultaneously sending a first shutdown control signal to a control terminal of the first shutdown circuit to turn on the first shutdown circuit and output a first shutdown signal to a sub-pixel. When the first shutdown circuit is turned on, the second shutdown circuit, the first startup circuit and the second startup circuit being turned off Step S204: in a fourth time period: continuing to maintain turning on the second switch unit, and sending a first switch startup signal to a control terminal of the first switch unit to turn on the first switch unit so that an energy storage element is in a charging state.

Step S205: in a fifth time period: continuing to maintain turning on the second switch unit, sending a first switch shutdown signal to the control terminal of the first switch unit to turn off the first switch unit so that the energy storage element is in a discharging state, and simultaneously sending a second shutdown control signal to the control terminal of the second shutdown circuit to turn on the second shutdown circuit and output a second shutdown signal to the sub-pixel. The sub-pixel is turned off after receiving the first shutdown signal and the second shutdown signal in turn. When the second shutdown circuit is turned on, the first shutdown circuit, the first startup circuit and the second startup circuit being turned off.

S206: in a sixth time period: sending a first switch startup signal to the control terminal of the first switch unit to turn on the first switch unit.

Step S207: in a seventh time period: maintaining turning on the first switch unit, and sending the second switch startup signal to the control terminal of the second switch unit to turn on the second switch unit so that the energy storage element is in the charging state.

Step S208: in an eighth time period: continuing to maintain turning on the first switch unit, sending a second switch shutdown signal to the control terminal of the second switch unit to turn off the second switch unit so that the energy storage element is in the discharging state, and simultaneously sending a second startup control signal to the control terminal of the second startup circuit to turn on the second startup circuit and output a second startup signal to the sub-pixel. When the second startup circuit is turned on, the first shutdown circuit, the second shutdown circuit and the first startup circuit are turned off.

Step S209: in a ninth time period: continuing to maintain turning on the first switch unit, and sending the second switch startup signal to the control terminal of the second switch unit to turn on the second switch unit so that the energy storage element is in the charging state.

Step S210: in a tenth time period: continuing to maintain turning on the first switch unit, sending the second switch shutdown signal to the control terminal of the second switch unit to turn off the second switch unit so that the energy storage element is in the discharging state, and simultaneously sending the first startup control signal to the control terminal of the first startup circuit to turn on the first startup circuit and output a first startup signal to the sub-pixel; the sub-pixel is turned on after receiving the second startup signal and the first startup signal in turn. When the first startup circuit is turned off, the second startup circuit, the first shutdown circuit and the second shutdown circuit are turned off.

Illustratively, in the second time period, the third switch unit of the first shutdown circuit is turned on with the third switching startup signal. In the fourth time period, the fourth switch unit of the second shutdown circuit is turned on with the fourth switch startup signal. In the eighth time period, the sixth switch unit of the second startup circuit is turned on with the sixth switch startup signal. In the tenth time period, the fifth switch unit of the first startup circuit is turned on with fifth switch startup signal.

Figure 14:
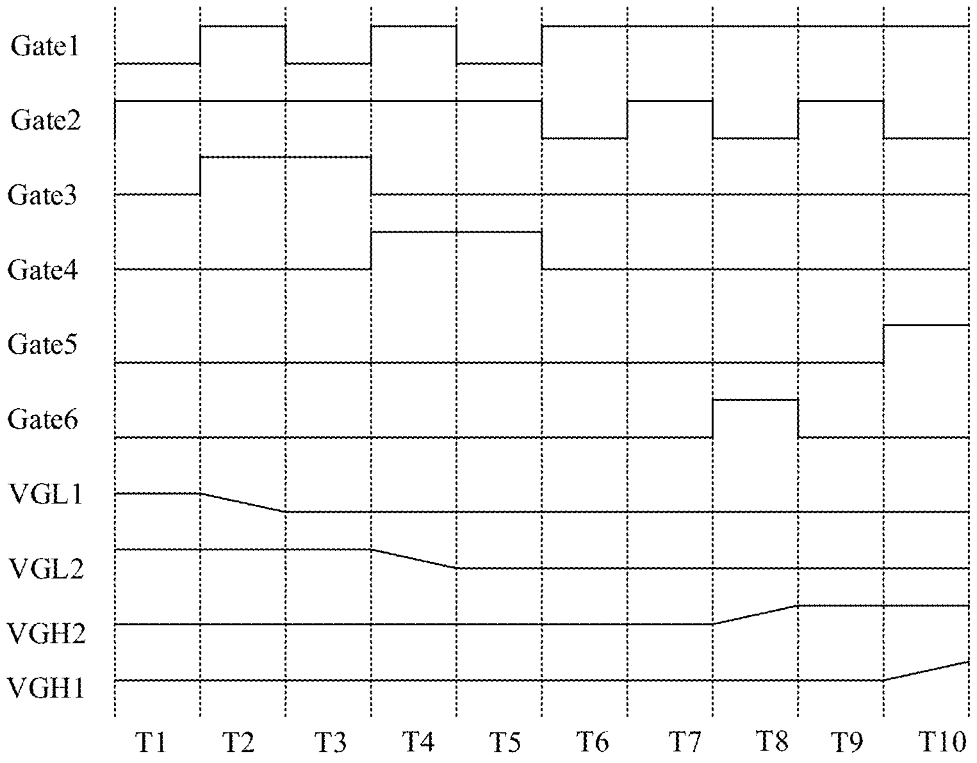
FIG. 14 is a driving timing diagram of the gate drive circuit according to the embodiment 2 of the present application.

Referring to FIGS. 14, T1 to T10 respectively denote the first time period to the tenth time period in turn. FIG. 14 shows only one alternative embodiment, and in another embodiment, T6 to T10 may also precede T1 to T5.

As shown in FIG. 14, in a time period T1, the second signal line outputs a high-level signal, and the second switch unit is turned on. In a time period T2, both the first signal line and the third signal line output a high-level signal, and both the first switch unit and the third switch unit are turned on to charge the inductor, so that the inductor is in the charging state. In a time period T3, the first signal line outputs a low-level signal, the first switch unit is turned off, the inductor is in the discharging state, the inductor releases charge to charge the first shutdown circuit to generate a first shutdown signal VGL1 voltage signal. In a time period T4, the first signal line and the fourth signal line both output a high-level signal, the first switch unit and the fourth switch unit are both turned on to charge the inductor, the inductor is in the charging state. In a time period T5, the first signal line outputs a low-level signal, the first switch unit is turned off, and the inductor releases charge to charge the second shutdown circuit to generate a second shutdown signal VGL2 voltage signal. In this way, the first and second shutdown signals VGL1 and VGL2 are generated.

In a time period T6, the first signal line outputs a high-level signal, the first switch unit is turned on, the inductor is connected to the power supply terminal. In a time period T7, the second signal line outputs a high-level signal, the second switch unit is turned on to charge the inductor, and the inductor is in a charging state at this time. In a time period of T8, the second signal line outputs a low-level signal, the second switch unit is turned off, and the sixth signal line outputs a high-level signal, the sixth switch unit is turned on, and the inductor is in the discharging state to form a boost and generate a second startup signal VGH2 voltage signal. In a time period T9, the second signal line outputs a high-level signal, the second switch unit is turned on, and the sixth switch unit is turned off to charge the inductor. In a time period T10, the second signal line outputs a low-level signal, the second switch unit is turned off, the fifth signal line outputs a high-level signal, the fifth switch unit is turned on, and the inductor is in the discharging state to form a boost loop and generate a first startup signal VGH1.

In this way, two-way VGL and two-way VGH are formed, and only one inductor is needed in this circuit, so that the circuit cost can be saved, and the driving ability is stronger than that of charge pump circuit.

Embodiment 3

Figure 15:
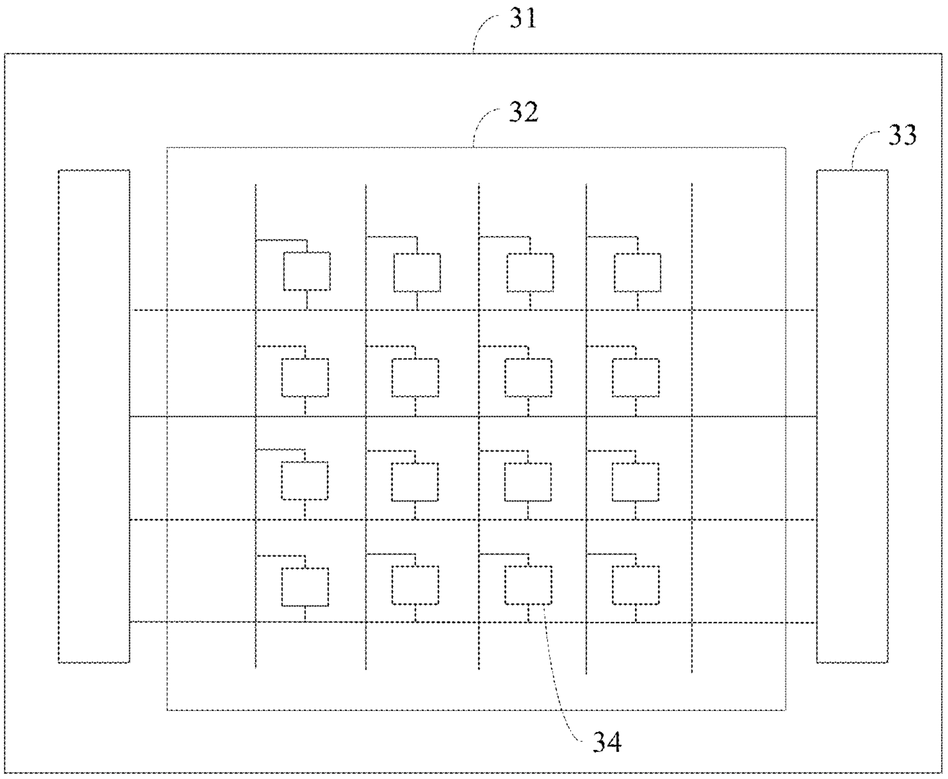
FIG. 15 is a schematic structural diagram of a display device according to embodiment 3 of the present application.

Referring to FIG. 15, embodiment 3 of the present application provides a display device including a display panel 31 and a gate drive circuit in the embodiment 1. A display area 32 of the display panel is provided with sub-pixels 34 arranged in an array. The gate drive circuit is provided in a non-display area 33 of the display panel. Output terminals of the first shutdown circuit, the second shutdown circuit, the first startup circuit and the second startup circuit are all connected to the sub-pixels 34.

Further, the non-display area 33 may include a GOA (Gate on Array) circuit.

By arranging the gate drive circuit in the display device, the cost of the display device can be reduced. In addition, the gate drive circuit is simple in structure and occupies a small space, which is beneficial to achieving a narrow frame of the display device, so as to improve the aesthetic taste of the display device.

Other embodiments of the present application will be apparent to those skilled in the art upon consideration of the description and practice of the present application disclosed herein. The present application is intended to encompass any variation, use, or adaptation of the present application that follows the general principles of the present application and includes commonly known or customary technical means in the art that are not disclosed herein. The description and embodiments are considered exemplary only, and the true scope and spirit of the present application is indicated by the following claims.

In the content of the description, illustration of the reference terms "an embodiment," means that specific features, structures, materials, or characteristics described in connection with the embodiment are encompassed in at least one embodiment or example of the present application. In the description, the schematic formulation of the above terms need not be directed to the same embodiments. Further, the specific features, structures, materials or characteristics described may be combined in a suitable manner in any one or more embodiments. Further, without contradicting one another, those skilled in the art may connect and combine different embodiments described in the description and features of different embodiments.

What is claimed is:

1. A gate drive circuit comprising:

a charging circuit comprising a first switch unit, a second switch unit and an energy storage element, wherein a first terminal of the first switch unit and a first terminal of the energy storage element are connected to a first node, a first terminal of the second switch unit and a second terminal of the energy storage element are connected to a second node, wherein a second terminal of the first switch unit is connected to a voltage supply terminal, a second terminal of the second switch unit is grounded, and the energy storage element switches between a charging state and a discharging state based on a control signal responded by a control terminal of the first switch unit and a control terminal of the second switch unit;

a first shutdown circuit and a second shutdown circuit, wherein input terminals of the first shutdown circuit and the second shutdown circuit being are connected to the first node, and output terminals of the first shutdown circuit and the second shutdown circuit being are connected to a sub-pixel; wherein the control terminal of the first shutdown circuit responds to a first shutdown control signal when the energy storage element is in a discharging state, so that the output terminal of the first shutdown circuit outputs a first shutdown signal to the sub-pixel; and wherein the control terminal of the second shutdown circuit responds to a second shutdown control signal when the energy storage element is in the discharging state, so that the output terminal of the second shutdown circuit outputs a second shutdown signal to the sub-pixel, wherein the first shutdown control signal and the second shutdown control signal are sequentially output, and the first shutdown signal and the second shutdown signal have different magnitudes; and a first startup circuit and a second startup circuit, wherein input terminals of the first startup circuit and the second startup circuit are connected to the second node, and output terminals of the first startup circuit and the second startup circuit are connected to the sub-pixel; wherein a control terminal of the first startup circuit responds to a first startup control signal when the energy storage element is in the discharging state, so that the output terminal of the first startup circuit outputs a first startup signal to the sub-pixel; and wherein a control terminal of the second startup circuit responds to a second startup control signal when the energy storage element is in the discharging state, so that the output terminal of the second startup circuit outputs a second startup signal to the sub-pixel, wherein the first startup control signal and the second startup control signal are sequentially output, and the first startup signal and the second startup signal have different magnitudes;

wherein the charging circuit further comprises a charging capacitor having a first terminal connected to the voltage supply terminal and a second terminal being grounded;

wherein when the energy storage element is in the charging state and the discharging state, the control terminal of the second switch unit is turned on in response to the second switch startup signal;

wherein when the energy storage element is in the charging state, the control terminal of the first switch unit is turned on in response to the first switch startup signal; and wherein when the energy storage element is in the discharging state, the control terminal of the first switch unit is turned off in response to the first switch shutdown signal.

2. The gate drive circuit according to claim 1, wherein the first switch startup signal and the second switch startup signal are high-level signals, and the first switch shutdown signal is a low-level signal.

3. The gate drive circuit according to claim 1, wherein the first shutdown circuit comprises a third switch unit, a first diode and a first capacitor, wherein an input terminal of the third switch unit being is connected to the first node, an output terminal of the third switch unit being is connected to a first terminal of the first diode, a second terminal of the first diode and a first terminal of the first capacitor being are connected to the output terminal of the first shutdown circuit, and a second terminal of the first capacitor is grounded; wherein a control terminal of the third switch unit is turned on in response to a third switch startup signal when the energy storage element is in the charging state and the discharging state; and wherein the second shutdown circuit comprises a fourth switch unit, a second diode and a second capacitor, wherein an input terminal of the fourth switch unit is connected to the first node, an output terminal of the fourth switch unit is connected to a first terminal of the second diode, a second terminal of the second diode and a first terminal of the second capacitor are connected to the output terminal of the second shutdown circuit, and a second terminal of the second capacitor is grounded; and wherein a control terminal of the fourth switch unit is turned on in response to a fourth switch startup signal, when the energy storage element is in the charging state and the discharging state.

4. The gate drive circuit according to claim 1, wherein the first startup circuit comprises a fifth switch unit and a third capacitor, wherein an input terminal of the fifth switch unit is connected to the second node, an output terminal of the fifth switch unit and a first terminal of the third capacitor are connected to the output terminal of the first startup circuit, and a second terminal of the third capacitor is grounded; wherein a control terminal of the fifth switch unit is turned off in response to the second switch shutdown signal, when the energy storage element is in the charging state, and a control terminal of the fifth switch unit is turned on in response to a fifth switch startup signal, when the energy storage element is in the discharging state; and wherein the second startup circuit comprises a sixth switch unit and a fourth capacitor, wherein an input terminal of the sixth switch unit is connected to the second node, an output terminal of the sixth switch unit and a first terminal of the fourth capacitor are connected to the output terminal of the second startup circuit, and a second terminal of the fourth capacitor is grounded; and wherein a control terminal of the sixth switch unit is turned off in response to the third switch shutdown signal, when the energy storage element is in the charging state, and when the energy storage element is in the discharging state, a control terminal of the sixth switch unit is turned on in response to a sixth switch startup signal.

5. The gate drive circuit according to claim 1, wherein the energy storage element is an inductive element.

6. The gate drive circuit according to claim 1, wherein the control terminals of the first switch unit, the second switch unit, the first shutdown circuit, the second shutdown circuit, the first startup circuit and the second startup circuit are connected to a same control chip.

7. The gate drive circuit according to claim 1, wherein the first shutdown signal and the second shutdown signal are low-level signals, the first shutdown signal is outputted before the second shutdown signal, and a value of the first shutdown signal is smaller than a value of the second shutdown signal; and wherein the first startup signal and the second startup signal are high-level signals, the second startup signal is outputted before the first startup signal, and a value of the second startup signal is larger than a value of the first startup signal.

8. A gate driving method comprising:

in a first time period: sending a second switch startup signal to a control terminal of a second switch unit to turn on the second switch unit;

in a second time period: maintaining turning on the second switch unit, and sending a first switch startup signal to a control terminal of the first switch unit to turn on the first switch unit so that an energy storage element is in a charging state;

in a third time period: continuing to maintain turning on the second switch unit, sending a first switch shutdown signal to the control terminal of the first switch unit to turn off the first switch unit so that the energy storage element is in a discharging state, and simultaneously sending a first shutdown control signal to a control terminal of a first shutdown circuit to turn on the first shutdown circuit and output a first shutdown signal to a sub-pixel; wherein a second shutdown circuit, the first startup circuit and the second startup circuit being turned off, when the first shutdown circuit is turned on;

in a fourth time period: continuing to maintain turning on the second switch unit, and sending the first switch startup signal to the control terminal of the first switch unit to turn on the first switch unit so that the energy storage element is in the charging state;

in a fifth time period: continuing to maintain turning on the second switch unit, sending a first switch shutdown signal to the control terminal of the first switch unit to turn off the first switch unit so that the energy storage element is in a discharging state, and simultaneously sending a second shutdown control signal to the control terminal of the first shutdown circuit to turn on the second shutdown circuit and output a second shutdown signal to the sub-pixel; wherein the sub-pixel is turned off after receiving the first shutdown signal and the second shutdown signal in turn; wherein the first shutdown circuit, the first startup circuit and the second startup circuit are turned off, when the second shutdown circuit is turned on;

in a sixth time period: sending a first switch startup signal to the control terminal of the first switch unit to turn on the first switch unit;

in a seventh time period: maintaining turning on the first switch unit, and sending the second switch startup signal to the control terminal of the second switch unit to turn on the second switch unit so that the energy storage element is in the charging state;

in an eighth time period: continuing to maintain turning on the first switch unit, sending a second switch shutdown signal to the control terminal of the second switch unit to turn off the second switch unit so that the energy storage element is in the discharging state, and simultaneously sending a second startup control signal to the control terminal of the second startup circuit to turn on the second startup circuit and output a second startup signal to the sub-pixel; wherein the first shutdown circuit, the second shutdown circuit and the first startup circuit being turned off, when the second startup circuit is turned on;

in a ninth time period: continuing to maintain turning on the first switch unit, and sending the second switch startup signal to the control terminal of the second switch unit to turn on the second switch unit so that the energy storage element is in the charging state; and in a tenth time period: continuing to maintain turning on the first switch unit, sending the second switch shutdown signal to the control terminal of the second switch unit to turn off the second switch unit so that the energy storage element is in the discharging state, and simultaneously sending the first startup control signal to the control terminal of the first startup circuit to turn on the first startup circuit and output a first startup signal to the sub-pixel; wherein the sub-pixel is turned on after receiving the second startup signal and the first startup signal in turn; wherein the second startup circuit, the first shutdown circuit and the second shutdown circuit being turned off, when the first startup circuit being turned off.

9. The gate driving method according to claim 8, further comprising:

adjusting a duty cycle to obtain the first shutdown signal and a second shutdown signal of different magnitudes, wherein the duty cycle is obtained by a volt-second balance.

10. The gate driving method according to claim 9, wherein a voltage of an inductor is equal to an input terminal voltage VDD when the first switch unit is turned on, and a voltage of the inductor is equal to an output terminal voltage VOUT When the first switch unit is turned off;

wherein the duty cycle D is obtained by formula:

$$D=V\mathrm{OUT}/(V\mathrm{OUT}+VDD).$$

11. The gate driving method according to claim 8, further comprising:

adjusting a duty cycle to obtain the first startup signal and a second startup signal of different magnitudes, wherein the duty cycle is obtained by a volt-second balance.

12. A display device comprising:

a display panel having a display area provided with sub-pixels arranged in an array; and a gate drive circuit disposed in a non-display area of the display panel, comprising:

a charging circuit comprising a first switch unit, a second switch unit and an energy storage element, wherein a first terminal of the first switch unit and a first terminal of the energy storage element are connected to a first node, a first terminal of the second switch unit and a second terminal of the energy storage element are connected to a second node, wherein a second terminal of the first switch unit is connected to a voltage supply terminal, a second terminal of the second switch unit is grounded, and the energy storage element switches between a charging state and a discharging state based on a control signal responded by a control terminal of the first switch unit and a control terminal of the second switch unit;

a first shutdown circuit and a second shutdown circuit, wherein input terminals of the first shutdown circuit and the second shutdown circuit being are connected to the first node, and the output terminals of the first shutdown circuit and the second shutdown circuit being are connected to a sub-pixel; wherein the control terminal of the first shutdown circuit responds to a first shutdown control signal when the energy storage element is in a discharging state, so that the output terminal of the first shutdown circuit outputs a first shutdown signal to the sub-pixel; and wherein the control terminal of the second shutdown circuit responds to a second shutdown control signal when the energy storage element is in the discharging state, so that the output terminal of the second shutdown circuit outputs a second shutdown signal to the sub-pixel, wherein the first shutdown control signal and the second shutdown control signal are sequentially output, and the first shutdown signal and the second shutdown signal have different magnitudes; and a first startup circuit and a second startup circuit, wherein input terminals of the first startup circuit and the second startup circuit are connected to the second node, and output terminals of the first startup circuit and the second startup circuit are connected to the sub-pixel; wherein a control terminal of the first startup circuit responds to a first startup control signal when the energy storage element is in the discharging state, so that the output terminal of the first startup circuit outputs a first startup signal to the sub-pixel; and wherein a control terminal of the second startup circuit responds to a second startup control signal when the energy storage element is in the discharging state, so that the output terminal of the second startup circuit outputs a second startup signal to the sub-pixel, wherein the first startup control signal and the second startup control signal are sequentially output, and the first startup signal and the second startup signal have different magnitudes;

wherein output terminals of the first shutdown circuit, the second shutdown circuit, the first startup circuit and the second startup circuit are connected to the sub-pixels;

wherein the charging circuit further comprises a charging capacitor having a first terminal connected to the voltage supply terminal and a second terminal being grounded;

wherein when the energy storage element is in the charging state and the discharging state, the control terminal of the second switch unit is turned on in response to the second switch startup signal;

wherein when the energy storage element is in the charging state, the control terminal of the first switch unit is turned on in response to the first switch startup signal; and wherein when the energy storage element is in the discharging state, the control terminal of the first switch unit is turned off in response to the first switch shutdown signal.

13. The display device according to claim 12, wherein the first switch startup signal and the second switch startup signal are high-level signals, and the first switch shutdown signal is a low-level signal.

14. The display device according to claim 12, wherein the first shutdown circuit comprises a third switch unit, a first diode and a first capacitor, wherein an input terminal of the third switch unit being is connected to the first node, an output terminal of the third switch unit being is connected to a first terminal of the first diode, a second terminal of the first diode and a first terminal of the first capacitor being are connected to the output terminal of the first shutdown circuit, and a second terminal of the first capacitor is grounded; wherein a control terminal of the third switch unit is turned on in response to a third switch startup signal when the energy storage element is in the charging state and the discharging state; and wherein the second shutdown circuit comprises a fourth switch unit, a second diode and a second capacitor, wherein an input terminal of the fourth switch unit is connected to the first node, an output terminal of the fourth switch unit is connected to a first terminal of the second diode, a second terminal of the second diode and a first terminal of the second capacitor are connected to the output terminal of the second shutdown circuit, and a second terminal of the second capacitor is grounded; and wherein a control terminal of the fourth switch unit is turned on in response to a fourth switch startup signal, when the energy storage element is in the charging state and the discharging state.

15. The display device according to claim 12, wherein the first startup circuit comprises a fifth switch unit and a third capacitor, wherein an input terminal of the fifth switch unit is connected to the second node, an output terminal of the fifth switch unit and a first terminal of the third capacitor are connected to the output terminal of the first startup circuit, and a second terminal of the third capacitor is grounded; wherein a control terminal of the fifth switch unit is turned off in response to the second switch shutdown signal, when the energy storage element is in the charging state, and a control terminal of the fifth switch unit is turned on in response to a fifth switch startup signal, when the energy storage element is in the discharging state; and wherein the second startup circuit comprises a sixth switch unit and a fourth capacitor, wherein an input terminal of the sixth switch unit is connected to the second node, an output terminal of the sixth switch unit and a first terminal of the fourth capacitor are connected to the output terminal of the second startup circuit, and a second terminal of the fourth capacitor is grounded; and wherein a control terminal of the sixth switch unit is turned off in response to the third switch shutdown signal, when the energy storage element is in the charging state, and when the energy storage element is in the discharging state, a control terminal of the sixth switch unit is turned on in response to a sixth switch startup signal.

16. The display device according to claim 12, wherein the energy storage element is an inductive element.

17. The display device according to claim 12, wherein the control terminals of the first switch unit, the second switch unit, the first shutdown circuit, the second shutdown circuit, the first startup circuit and the second startup circuit are connected to a same control chip.

18. The display device according to claim 12, wherein the first shutdown signal and the second shutdown signal are low-level signals, the first shutdown signal is outputted before the second shutdown signal, and a value of the first shutdown signal is smaller than a value of the second shutdown signal; and wherein the first startup signal and the second startup signal are high-level signals, the second startup signal is outputted before the first startup signal, and a value of the second startup signal is larger than a value of the first startup signal.

* * * * *